(12) United States Patent
Zätterqvist (10) Patent No.: US 8,607,682 B2
(45) Date of Patent: Dec. 17, 2013

(54) COUNTERMEASURE ARRANGEMENT (75) Inventor: Christer Zätterqvist, Uppsala (SE)

(73) Assignee: SAAB AB, Linköping (SE)

( * ) Notice: Subject to any disclaimer, the term of this patent is extended or adjusted under 35 U.S.C. 154(b) by 0 days.

(21) Appl. No.: 13/266,041

(22) PCT Filed: Apr. 23, 2009

(86) PCT No.: PCT/SE2009/050423
§ 371 (c)(1),
(2), (4) Date: Jan. 10, 2012

(87) PCT Pub. No.: WO2010/123422
PCT Pub. Date: Oct. 28, 2010

(65) Prior Publication Data
US 2012/0097795 A1    Apr. 26, 2012

(51) Int. Cl.
*B64D 1/02*   (2006.01)

(52) U.S. Cl.
USPC ............................. 89/1.51; 89/36.11; 244/1 R (58) Field of Classification Search
USPC ...................... 89/1.51, 36.11, 36.16; 244/1 R
See application file for complete search history.

(56) References Cited

U.S. PATENT DOCUMENTS

| | | | |
|---|---|---|---|
| 3,430,533 A | 3/1969 | Kifor et al. | |
| 3,808,941 A | 5/1974 | Biggs | |
| 4,417,709 A | 11/1983 | Fehrm | |
| 4,616,793 A | 10/1986 | Hassler, Jr. | |
| 4,679,483 A | 7/1987 | Wrana | |
| H324 H | 9/1987 | Rubin | |
| 4,696,442 A | 9/1987 | Mazzitelli | |
| 5,050,477 A | 9/1991 | Cowdery et al. | |
| 5,198,609 A * | 3/1993 | Gillman | 89/1.51 |
| 5,340,054 A | 8/1994 | Smith et al. | |
| 5,461,960 A * | 10/1995 | Marks et al. | 89/1.51 |
| 5,699,981 A | 12/1997 | McGrath et al. | |
| 6,098,925 A | 8/2000 | Burdsall, II et al. | |
| 6,619,178 B1 | 9/2003 | Fransson et al. | |
| 7,373,886 B2 * | 5/2008 | Zatterqvist et al. | 102/505 |
| 7,520,467 B2 * | 4/2009 | Gioffre et al. | 244/118.1 |
| 7,600,477 B2 * | 10/2009 | Zatterqvist | 102/505 |

(Continued)

FOREIGN PATENT DOCUMENTS

| | | |
|---|---|---|
| EP | 1950522 A1 | 7/2008 |
| FR | 2665875 A1 | 2/1992 |

(Continued)

OTHER PUBLICATIONS

PCT/ISA/210—International Search Report—Oct. 29, 2009.

(Continued)

*Primary Examiner* — Benjamin P Lee
(74) *Attorney, Agent, or Firm* — Venable LLP; Eric J. Franklin (57) ABSTRACT

A countermeasure arrangement including a countermeasure dispenser. An envelope at least partly encloses the countermeasure dispenser. A first control module is configured to control the countermeasure dispenser. A suspension module is arranged on the envelope for suspending the envelope on an aircraft. The suspension module has a form and a design that substantially correspond to the form and design of a suspension rail of a missile, so that the suspension module mates to a hard point on the aircraft, which is adapted to the missile.

11 Claims, 6 Drawing Sheets

(56) References Cited

U.S. PATENT DOCUMENTS

| | | | |
|---|---|---|---|
| 7,614,334 B2 * | 11/2009 | Bellino et al. | 89/1.51 |
| 7,840,124 B2 * | 11/2010 | Olwin | 396/12 |
| 7,866,246 B2 * | 1/2011 | Bellino et al. | 89/1.51 |
| 2003/0192992 A1 | 10/2003 | Olsen et al. | |
| 2004/0104309 A1 | 6/2004 | Segota et al. | |
| 2004/0200381 A1 | 10/2004 | Zatterqvist | |
| 2004/0200382 A1 * | 10/2004 | Zatterqvist et al. | 102/505 |
| 2005/0204910 A1 | 9/2005 | Padan | |
| 2009/0084253 A1 * | 4/2009 | Bellino et al. | 89/1.51 |
| 2009/0084254 A1 | 4/2009 | Bellino et al. | |
| 2012/0125183 A1 * | 5/2012 | Zatterqvist | 89/1.51 |

FOREIGN PATENT DOCUMENTS

| | | | |
|---|---|---|---|
| GB | 191424021 A | 0/1915 | |
| GB | 2177668 A | 1/1987 | |
| WO | WO-00/59782 | 10/2000 | |
| WO | WO-02/090867 A1 | 11/2002 | |
| WO | WO-03/097453 A2 | 11/2003 | |

OTHER PUBLICATIONS

PCT/ISA/237—Written Opinion of the International Searching Authority—October 29, 2009.

PCT/IPEA/408—Written Opinion of the International Preliminary Examining Authority—March 1, 2011.

PCT/IPEA/408—Written Opinion of the International Preliminary Examining Authority—May 12, 2011.

PCT/IPEA/409—International Preliminary Report on Patentability—June 27, 2011.

European Search Report—Sep. 13, 2013 (Issued in Counterpart Application No. 09843739.5).

Office Action Issued August 29, 2013—in U.S. Appl. No. 13/266,083.

* cited by examiner

COUNTERMEASURE ARRANGEMENT

CROSS-REFERENCE TO RELATED APPLICATIONS

This application is the national phase under 35 U.S.C. §371 of PCT/SE2009/050423 filed 23 Apr. 2009.

TECHNICAL FIELD

The present invention relates to a countermeasure arrangement.

BACKGROUND ART

Dispenser units arranged to dispense countermeasures from aircrafts are well known. Both fighter and transport aircrafts, as well as civil aircrafts are exposed for threats from self-guided missiles equipped with radar, IR or laser sensors, which can be fired either from other aircrafts or from the ground. In order to protect the threatened aircrafts from an attack of such missiles they are provided with various types of dispenser units which dispense countermeasure means. Such countermeasure means may comprise aluminized foil or fibers, pyrophoric IR materials, flares and also laser-reflecting fibers or foils, which confuse and divert missiles aimed at the aircraft.

The amount of countermeasures in the form of aluminized foil, fibers and chaffs carried by aircraft is substantially limited due to the great number of different weapons, sensors, cameras and external fuel tanks carried by the aircraft.

Document WO-A2-03/0974453 discloses a system and method for conversion of external fuel tanks on aircrafts into airborne stores. The fuel tank may be converted into a countermeasure dispenser pod by a complete re-configuration of the internal structure of the tank in order to accommodate a chaff dispensing assembly. The dispersion of the chaffs is controlled by an electronic control box. The conversion procedures consists of adapting the external fuel tank-aircraft interface to the requirements of the stores system, adapting the pylon to the new functionality, reconstructing the fuel tank to the new functionality, and enhancing the internal stores management and control systems such as to provide additional controlling and monitoring functions. Thus, when the fuel tank is converted into a chaff dispenser pod also the control systems in the aircraft are converted. Also, the hard points or weapon stations on the aircraft must be so performed or converted that an external fuel tank can be installed at the hard point. Additionally, the electrical terminals at the hard point between the electrical control box in the converted fuel tank and the stores control console in the aircraft must be so performed or converted that the electrical control box in the converted fuel tank and the stores control console in the aircraft can communicate with each other.

The fuel tank converted into a chaff dispenser pod is provided with a chaff dispersal chamber in the rear of the converted fuel tank. Chaffs are dispersed through chaff dispersal doors arranged in the rear chaff dispersal chamber. The chaff dispersal doors are arranged in a downwardly direction in relation to the converted fuel tank and the aircraft. Thus, the chaffs will be dispensed in a substantially downwardly and backwardly direction in relation to the aircraft.

The objective problem to be solved by the present invention is to increase the capacity of countermeasures on aircrafts.

Another objective problem to be solved by the present invention is to easy and quickly adapt the aircraft for different missions.

A further objective problem to be solved by the present invention is to provide an aircraft with an arrangement for countermeasures without changing the design of the aircraft.

A further objective problem to be solved by the present invention is to increase the protection of an aircraft against incoming threats.

SUMMARY OF THE INVENTION

The above-mentioned objects are achieved by an arrangement for countermeasures.

When the suspension means of the envelope has a form and a design that substantially correspond to the form and design of a suspension rail of a missile, there is no need to change the design of the aircraft when providing the aircraft with the arrangement according to the present invention. Existing aircrafts are provided with several hard points for missiles. Therefore, the aircraft may easily and quickly be adapted for different missions. In one mission the aircraft must be armed with missiles depending on the mission profile. In another mission the aircraft should be provided with an increased amount of countermeasures. In some missions the need of a significantly increased chaff payload is high and therefore substantially all hard points for missiles may be provided with the arrangement for countermeasures according to the present invention. Thus, the capacity of countermeasures on aircrafts may be increased by the present invention.

First electrical terminals are arranged at the suspension means, which are connected to the first control means for controlling the countermeasure dispenser, and the first electrical terminals substantially correspond to the form and design of electrical connections of a missile. When arranging electrical terminals at the suspension means of the envelope electrical power and control signals can be supplied to the first control means and to the countermeasure dispenser. Since the first electrical terminals substantially correspond to the form and design of electrical connections of a missile there is no need to reconstructing the hard point of the aircraft.

The first electrical terminals are adapted to mate with second electrical terminals on the hard point on the aircraft. When electrical terminals mate a trouble-free transmission of power and control signals between the aircraft and the arrangement according to the present invention is possible.

The first control means is adapted to communicate with second control means on the aircraft. The first control means of the arrangement according to the present invention can communicate with second control means on the aircraft without reconstructing the second control system on the aircraft. This decreases costs for arranging the arrangement according to the present invention on the aircraft.

The envelope has a form and a design which substantially correspond to a form and a design of a missile. This makes it possible to exchange the missiles on the aircraft without any conflicts with surrounding equipment on the aircraft. Also, there will be no change in airdrag and manoverability of the aircraft.

Preferably, the countermeasure dispenser comprises a first and a second countermeasure dispenser unit. When using two countermeasure dispensing units the countermeasure payload increases and an even more effective countermeasure arrangement is achieved.

The first countermeasure dispenser unit is arranged at a first end part of the envelope and the second countermeasure dispenser unit is arranged at a second end part of the envelope.

The volume within the envelope is then used effectively and the countermeasures can be dispensed in different directions.

The first countermeasure dispenser unit has a pyrotechnical drive mechanism and the second countermeasure dispenser unit has an electro-mechanical or pyrotechnical drive mechanism. Thus, different types of countermeasures may be used and as a result a more effective countermeasure arrangement is achieved.

The second countermeasure dispenser unit is a BOL countermeasure dispenser. The BOL is an effective countermeasure dispenser unit which has an overall design and configuration which is suitable to use in the countermeasure arrangement according to the present invention.

According to an embodiment of the invention the envelope is pivotable at least partly about a longitudinal axis of the envelope. The direction of dispensing the countermeasures may be adjusted in relation to the specific aircraft the countermeasure arrangement is installed to.

Preferably, the countermeasure dispenser is arranged in that part of the envelope that is pivotable, so that countermeasures may be dispensed in different directions in relation to an aircraft on which the arrangement is arranged. This will increase the flexibility efficiency of the countermeasure arrangement.

The missile referred to above is of the type AIM-7, AIM-9, AIM-132, AIM-120 or
IRIS-T. These types of missiles are widely used on different aircrafts worldwide. The countermeasure arrangement according to the present invention may therefore be a useful arrangement on aircrafts using these types of missiles.

BRIEF DESCRIPTION OF THE DRAWINGS

Further advantages and features of the invention can be derived from the following detailed description of exemplary embodiments of the invention, with reference to the drawings.

DETAILED DESCRIPTION

Figure 1:
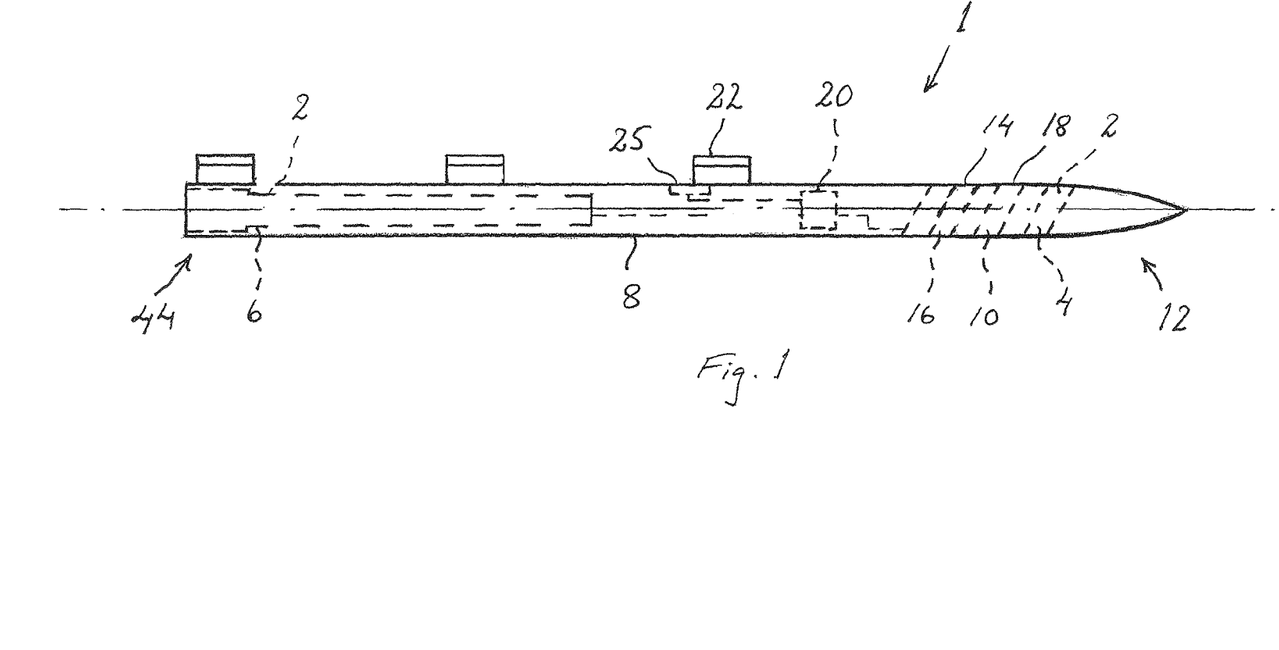
FIG. 1 shows a side view of a first embodiment of a countermeasure arrangement according to the present invention.

FIG. 1 shows a side view of a first embodiment of a countermeasure arrangement 1 according to the present invention. The countermeasure arrangement 1 is provided with a countermeasure dispenser 2, which comprises a first countermeasure dispenser unit 4 and second countermeasure dispenser unit 6. The first and second countermeasure dispenser units 4, 6 are at least partly enclosed by an envelope 8 having an elongated outer form and a substantially circular cross section designed to minimize the air drag.

Openings for dispensing countermeasures 10 from the first and second countermeasure dispenser units 4, 6 are arranged in the envelope 8. At the front part 12 of the envelope 8 there is a front opening 14 at the first countermeasure dispenser unit 4, which comprises a compartment section with a number of compartments 16, intended to accommodate countermeasures in the form of preferably propelled or un-propelled flares or countermeasure 10. The countermeasures are preferably accommodated in cartridges (not disclosed) which can be of a type known in this field and will therefore not be discussed in detail here. The compartments 16.1, 16.2, . . . 16.n can be of the same size or of different sizes and can accommodate identical or different types of countermeasures. The compartments 16.1, 16.2, . . . 16.n are preferably arranged side by side in rows creating a matrix pattern. The compartments 16.1, 16.2, . . . 16.n are suitably designed to slope alt or forwards 30° to 60° and preferably about 45° relative to the aircraft and also relative the elongated envelope 8, which is depicted in FIG. 1 with broken lines. The compartments 16.1, 16.2, . . . , 16.n are provided with openings 18.1, 18.2, . . . , 18.n and are intended to launch the countermeasures in a direction obliquely forward in relation to the aircraft.

Figure 2:
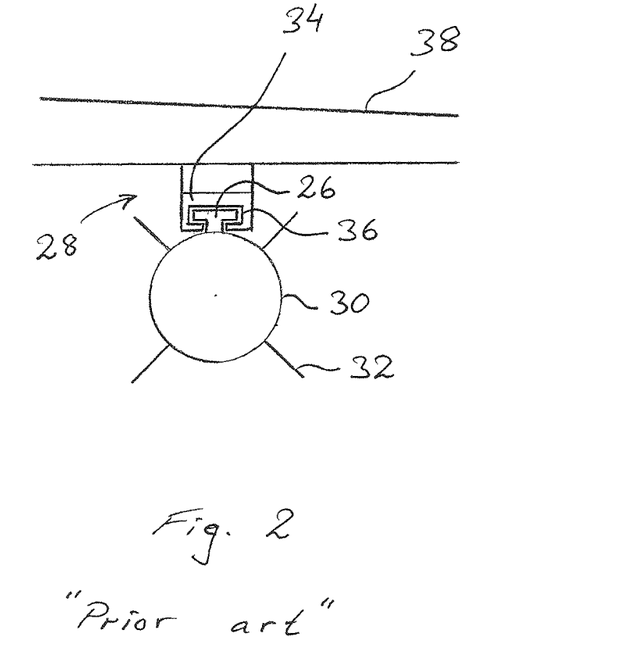
FIG. 2 shows a front view of a known missile, which is suspended under the wing of an aircraft.

The countermeasure arrangement 1 is provided with first control means 20 for controlling the first and second countermeasure dispenser units 4, 6. First electrical terminals 25 are arranged at the suspension means 22, which are connected to the first control means 20 for controlling the first and second countermeasure dispenser units 4, 6. Suspension means 22 are arranged on the envelope 8 for suspending the envelope 8 on an aircraft 24 (FIG. 2). The suspension means 22 has a form and a design that substantially correspond to the form and design of a suspension rail 26 of a missile 30, so that the suspension means 22 mates to a hard point 28 on the aircraft 24, which is adapted to the missile 30. The missile referred to is of the type AIM-7, AIM-9, AIM-132, AIM-120 or IRIS-T. These types of missiles 30 are widely used on different aircrafts 24 worldwide.

FIG. 2 shows a front view of a known missile, which is suspended under the wing of an aircraft. The suspension means 22 has a form and a design that substantially correspond to the form and design of the suspension rail 26 of a missile 30. The missile 30 is provided with control surfaces in the form of fins 32, which directs and steers the missile 30 towards a target. The countermeasure arrangement according to the present invention can also be provided with fins in order to achieve similar aerodynamic characteristics as a missile 30. The suspension means 22 on the missile 30 is provided with one or more rails 26, which have the form of a "T" in cross section view. A corresponding guide rail 34 on the hard point 28 at the aircraft 24 has a slot 36, which have the form of a corresponding "T" in cross section view. The guide rails 34 on the aircraft 24 and the suspension rail 26 on the missile 30 extend in a direction which substantially corresponds to the direction of the longitudinal axis of the missile 30.

Figure 3:
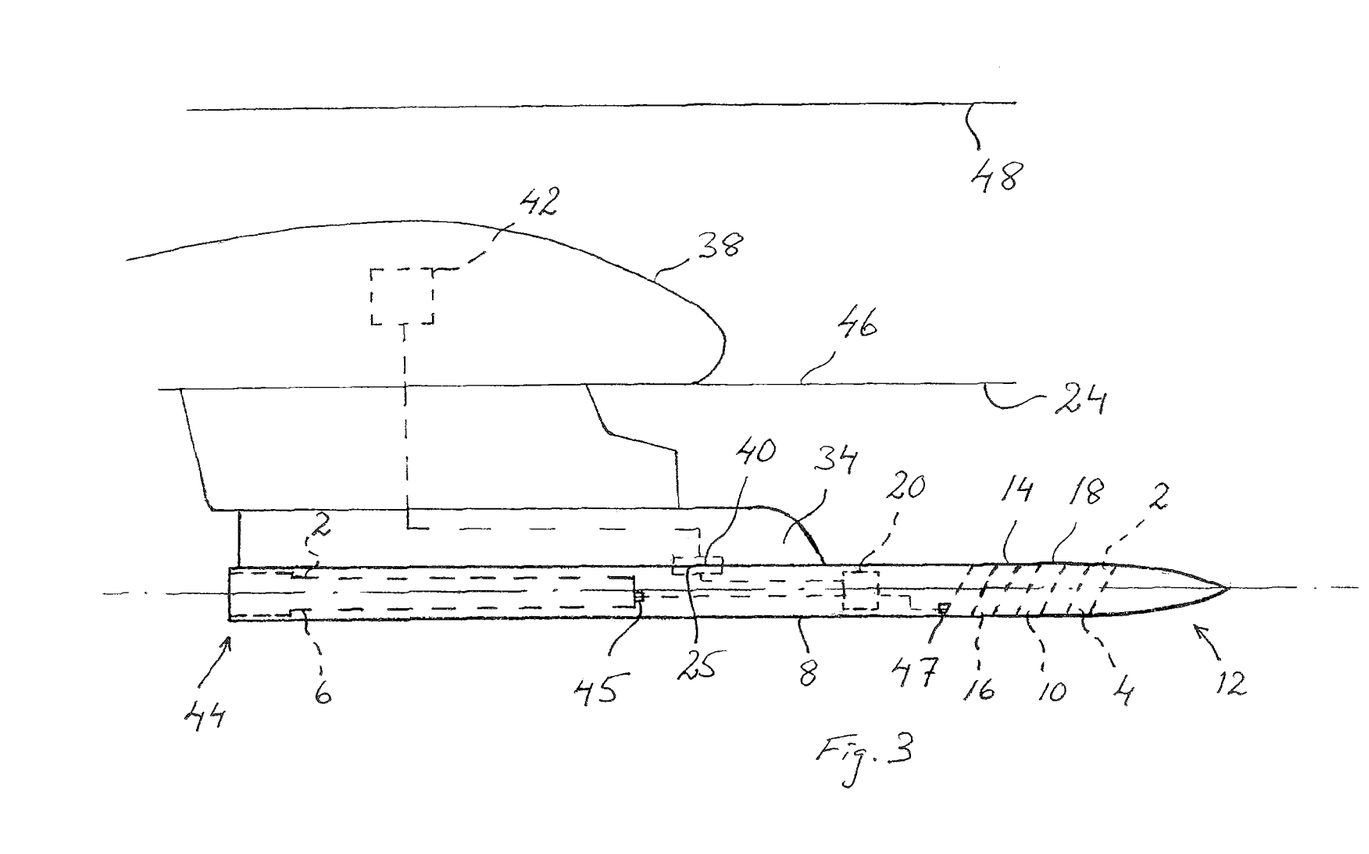
FIG. 3 shows the countermeasure arrangement according to FIG. 1 suspended on a wing of an aircraft.

FIG. 3 shows the countermeasure arrangement 1 according to FIG. 1 suspended under a wing 38 of an aircraft 24. First electrical terminals 40 are arranged at the suspension means 22, which are connected to the first control means 20 for controlling the first and second countermeasure dispenser units 4, 6. The first electrical terminals 25 substantially correspond to the form and design of electrical connections of the above-mentioned missiles, so that the first electrical terminals 25 are adapted to mate with second electrical terminals 40 at the hard point 28 on the aircraft 24. As a result, power and control signals can be supplied to the first control means 20 and to the first and second countermeasure dispenser units 4, 6. Since the first electrical terminals 25 substantially correspond to the form and design of electrical connections of a missile 30 there is no need to reconstructing the hard point 28 of the aircraft 24. The first control means 20 is adapted to communicate with second control means 42 on the aircraft 24 without reconstructing the second control system 42 on the aircraft 24. Thus, this decreases costs for arranging the countermeasure arrangement 1 according to the present invention on the aircraft 24.

The envelope 8 has a form and a design which substantially correspond to a form and a design of one of the above-mentioned missiles 30. This makes it possible to exchange the missiles 30 on the aircraft 24 without any conflicts with surrounding equipment on the aircraft 24. Also, there will be no change in airdrag and manoverability of the aircraft 24 when the envelope 8 has a form and a design which substantially correspond to a form and a design of one of the above-mentioned missiles 30.

As mentioned above the suspension means 22 has a form and a design that substantially correspond to the form and design of a suspension rail 26 of a missile 30, so that the suspension means 22 mates to a hard point 28 on the aircraft 24, which is adapted to the missile 30. The suspension means 22 on the envelope 8 of the countermeasure arrangement 1 is thus provided with one or more suspension means 22, which have the form of a "T" in cross section view. The corresponding guide rail 34 on the hard point 28 at the aircraft 24 has a slot 36, which have the form of a corresponding "T" in cross section view. The suspension rail 26 on the aircraft 24 and the suspension means 22 on the envelope 8 extend in a direction which substantially corresponds to the direction of the longitudinal axis of the envelope 8

As mentioned above, the countermeasure dispenser 1 comprises a first and a second countermeasure dispenser unit 4, 6. When the countermeasure arrangement 1 is provided with two countermeasure dispensing units 4, 6 the countermeasure payload increases and an even more effective countermeasure arrangement 1 is achieved. The countermeasure dispenser 2 can however comprise more than two countermeasure dispenser units. The first countermeasure dispenser unit 4 is arranged at the first end part 12 of the envelope 8 and the second countermeasure dispenser unit 6 is arranged at a second end part 44 of the envelope 8. The volume within the envelope 8 is thus used effectively and the countermeasures can be dispensed in different directions. The first countermeasure dispenser unit 4 has a pyrotechnical drive mechanism 47 and the second countermeasure dispenser unit has an electromechanical or pyrotechnical drive mechanism 45. Thus, different types of countermeasures may be used and as a result a more effective countermeasure arrangement 1 is achieved. The second countermeasure dispenser unit 6 is an electromechanical dispenser of the BOL-type countermeasure dispenser, which is an effective countermeasure dispenser unit which has an overall design and configuration which is suitable to use in the countermeasure arrangement 1 according to the present invention.

Figure 4:
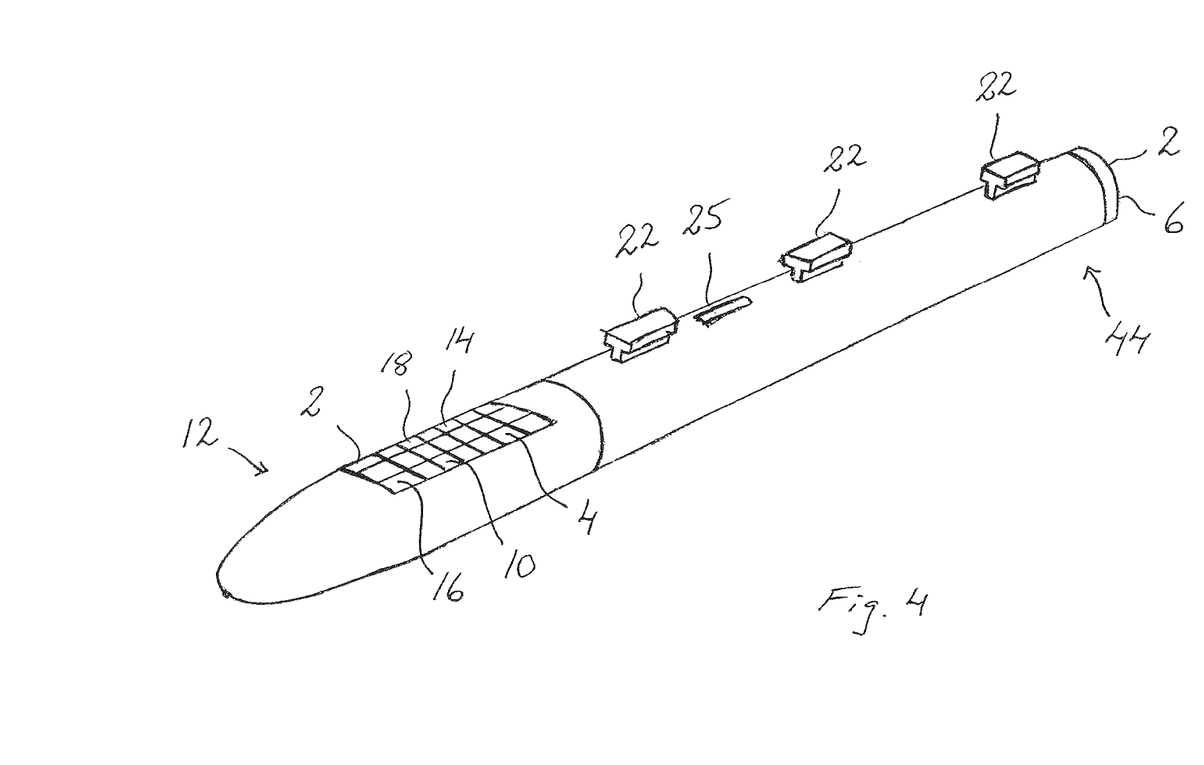
FIG. 4 shows a view in perspective of a second embodiment of a countermeasure arrangement according to the present invention.

FIG. 4 shows a view in perspective of a second embodiment of a countermeasure arrangement 1 according to the present invention. The envelope 8 is pivotable at least partly about a longitudinal axis of the envelope 8. The direction of dispensing the countermeasures may be adjusted in relation to the specific aircraft 24 the countermeasure arrangement 1 is installed to. Preferably, the countermeasure dispenser 2 is arranged in that part of the envelope 8 that is pivotable, so that countermeasures may be dispensed in different directions in relation to an aircraft 24 on which the arrangement is arranged. This will increase the flexibility and the efficiency of the countermeasure arrangement 1. In the embodiment according to FIG. 3 the front part 12 of the envelope, in which the first countermeasure dispenser unit 4 is installed, is pivotable about the longitudinal axis of the envelope 8. Thus, when pivoting the front part 12 of the envelope 8 the direction of the front opening 14 for dispensing countermeasures from the first countermeasure dispenser unit 4 will change and therefore also the countermeasures will be dispensed in a different direction in relation to the aircraft 24. The pivotal movement of the envelope 8 may be performed manually when the aircraft 24 is situated on ground and before take-off. As an alternative, the pivotal movement can be performed automatically by a signal from the second control means 42 in the aircraft 24.

The countermeasures can advantageously be launched obliquely forwards and downwards and to the side depending on how the front part 12 of the envelope 8 has been pivoted. The ability to pivot the front part 12 of the envelope 8 makes it possibly to guide out the countermeasures further from the main body 46 of the aircraft 24 and thus reduce the risks of inadvertent collisions occurring between countermeasures and the main body 46.

Figure 5A:
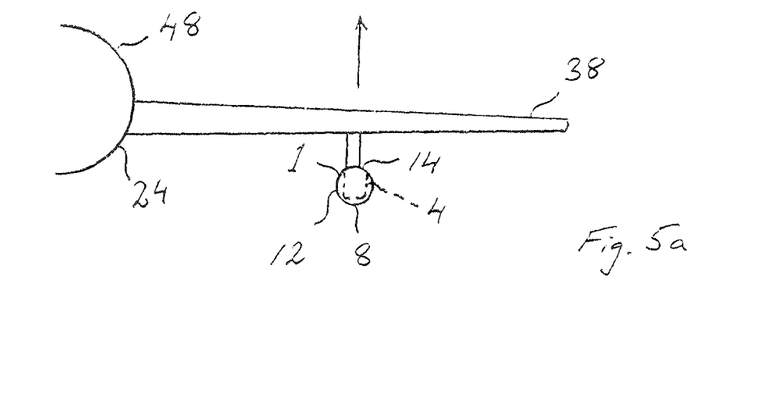
FIGS. 5a-5d show the countermeasure arrangement according to FIG. 4 in a front view and in three different positions.
Figure 5B:
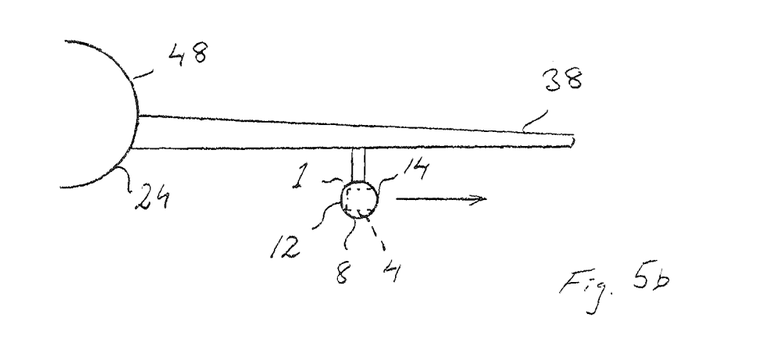
Figure 5C:
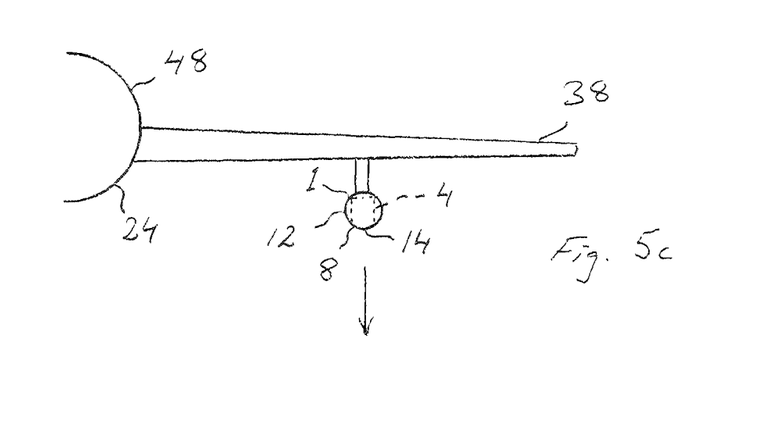
Figure 5D:
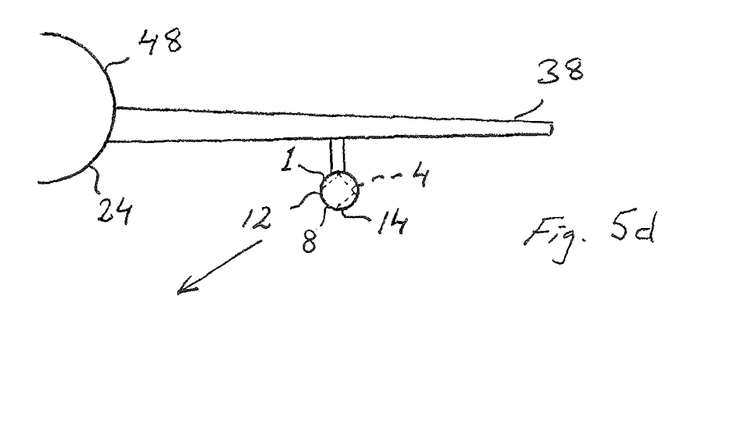

FIG. 5a-5d show the countermeasure arrangement 1 according to FIG. 4 in a front view and in three different positions. In FIG. 5a the front part 12 of the envelope 8 is so pivoted that front opening 14 is directed upwards in relation to the aircraft 24. When the front opening 14 of the front part 12 of the envelope 8 is pivoted in the upward direction the countermeasures are dispensed from the first countermeasure dispensing unit 4 in an upward direction in relation to the aircraft 24, indicated by the arrow in FIG. 5a. In FIG. 5b the front part 12 of the envelope 8 is so pivoted that front opening 14 is directed away from the fuselage 48 of the aircraft 24. When the front opening 14 of the front part 12 of the envelope 8 is directed away from the fuselage 48 of the aircraft 24 the countermeasures are dispensed from the first countermeasure dispensing unit 4 in a sideward direction in relation to the aircraft 24, indicated by the arrow in FIG. 5b. In FIG. 5c the front part of the envelope 8 is so pivoted that front opening 14 is directed in a downward direction in relation to the aircraft 24. When the front opening 14 of the front part 12 of the envelope 8 is directed downwards the countermeasures are dispensed from the first countermeasure dispensing unit 4 in a downward direction in relation to the aircraft 24, indicated by the arrow in FIG. 5c. It is also possible to pivot the front part 12 of the envelope 8 in an intermediate position in relation to the positions disclosed in FIGS. 5a-5c. For example, the countermeasures may be dispensed from the first countermeasure dispensing unit 4 in a downward and inward direction in relation to the aircraft 24, indicated by the arrow in FIG. 5d. When an envelope 8 is arranged on each wing of an aircraft 24, the countermeasures therefore may be dispensed in a cross wise direction in relation to each others. However, the front part 12 of the envelope 8 should not be pivoted in such a direction that the countermeasures hit the aircraft 24 when dispensed from the countermeasure dispenser 2.

Figure 6:
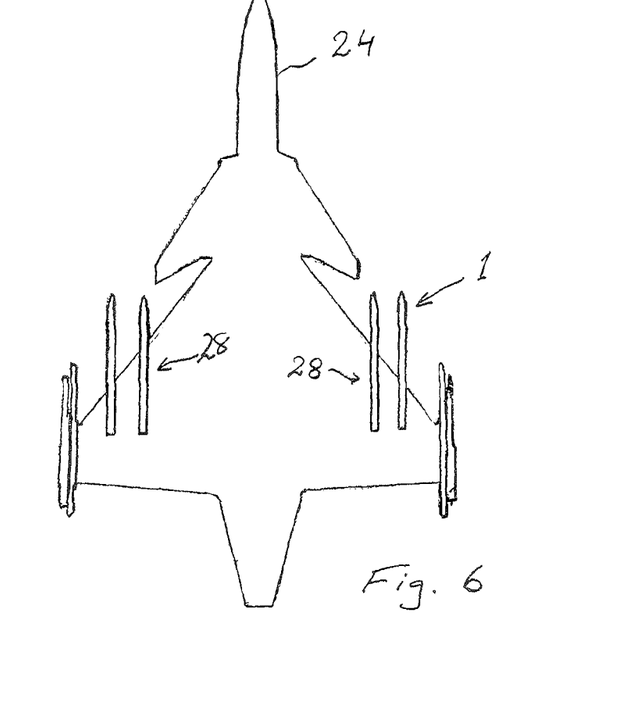
FIG. 6 shows an aircraft from below provided with a plurality of countermeasure arrangements according to the present invention.

FIG. 6 shows an aircraft 24 from below provided with a plurality of countermeasure arrangements 1 according to the present invention. The aircraft 24 is provided with several hard points 28 for missiles 30 and the aircraft 24 may therefore easily and quickly be adapted for different missions. For example, in one mission the aircraft 24 must be armed with missiles 30 depending on the mission profile and in another mission the aircraft 30 should be provided with an increased amount of countermeasures. In some missions the need of a significantly increased countermeasure payload is high and therefore substantially all hard points 28 for missiles 30 may be provided with a countermeasure arrangement 1 according to the present invention. Thus, the capacity of countermeasures on aircrafts may be increased by the present invention.

The features of the invention described in the application can be applied on all the embodiments disclosed above.

The invention claimed is:

1. A countermeasure arrangement, comprising:
    a countermeasure dispenser,
    an envelope at least partly enclosing the countermeasure dispenser,
    a first control module configured to control the countermeasure dispenser,
    a suspension module arranged on the envelope and configured to suspend the envelope on an aircraft, wherein the suspension module has a form and a design that substantially correspond to a form and design of a suspension rail of a missile, so that the suspension module mates to a hard point on the aircraft, which is adapted to the missile,
    wherein the envelope is pivotable at least partly about a longitudinal axis of the envelope, and wherein the countermeasure dispenser is arranged in that part of the envelope that is pivotable, so that countermeasures may be dispensed in different directions in relation to an aircraft on which the arrangement is arranged.

2. The arrangement according to claim 1, wherein first electrical terminals are arranged at the suspension module, which first electrical terminals are connected to the first control module for controlling the countermeasure dispenser, and wherein the first electrical terminals substantially correspond to a form and design of electrical connections of a missile.

3. The arrangement according to claim 2, wherein the first electrical terminals are adapted to mate with second electrical terminals on the hard point on the aircraft.

4. The arrangement according to claim 1, wherein the first control module is adapted to communicate with a second control module on the aircraft.

5. The arrangement according to claim 1, wherein the envelope has a form and a design which substantially correspond to a form and a design of a missile.

6. The arrangement according to claim 1, wherein the countermeasure dispenser comprises a first and a second countermeasure dispenser unit.

7. The arrangement according to claim 6, wherein the first countermeasure dispenser unit is arranged at a first end part of the envelope and the second countermeasure dispenser unit is arranged at a second end part of the envelope.

8. The arrangement according to claim 6, wherein the first countermeasure dispenser unit has a pyrotechnical drive mechanism and the second countermeasure dispenser unit has an electro-mechanical or pyrotechnical drive mechanism.

9. The arrangement according to claim 8, wherein the second countermeasure dispenser unit is a BOL countermeasure dispenser.

10. The arrangement according to claim 1, wherein the missile is of the type AIM-7, AIM-9, AIM-132, AIM-120 or IRIS-T.

11. An aircraft, comprising:
    a fuselage;
    a wing; and
    a countermeasure arrangement including a countermeasure dispenser, an envelope at least partly enclosing the countermeasure dispenser, a first control module configured to control the countermeasure dispenser, a suspension module arranged on the envelope and configured to suspend the envelope on the aircraft, wherein the suspension module has a form and a design that substantially correspond to a form and design of a suspension rail of a missile so that the suspension module mates to a hard point on the aircraft that is adapted to the missile, wherein the envelope is pivotable at least partly about a longitudinal axis of the envelope, and wherein the countermeasure dispenser is arranged in that part of the envelope that is pivotable so that countermeasures may be dispensed in different directions in relation to the aircraft.

* * * * *